US012805500B2

(12) United States Patent
Stewart

(10) Patent No.: US 12,805,500 B2
(45) Date of Patent: Nov. 24, 2026

(54) KNOT-TYING DEVICE

(71) Applicant: Geoffrey Stewart, Bethesda, MD (US)

(72) Inventor: Geoffrey Stewart, Bethesda, MD (US)

( * ) Notice: Subject to any disclaimer, the term of this patent is extended or adjusted under 35 U.S.C. 154(b) by 0 days.

(21) Appl. No.: 18/953,008

(22) Filed: Nov. 19, 2024

(65) Prior Publication Data

US 2026/0138847 A1 May 21, 2026

(51) Int. Cl.
*A01K 91/04* (2006.01)
*B65H 69/04* (2006.01)

(52) U.S. Cl.
CPC ............. *A01K 91/04* (2013.01); *B65H 69/04* (2013.01)

(58) Field of Classification Search
CPC ...... A01K 91/04; A01K 91/047; B65H 69/04; B65H 13/265
USPC ............................................................ 289/17
See application file for complete search history.

(56) References Cited

U.S. PATENT DOCUMENTS 1,572,907 A * 2/1926 Taylor ..................... B21F 15/00 140/123
2,145,439 A * 1/1939 Torrence ................ A01K 91/04 242/448
2,469,037 A * 5/1949 Harvey .................. A01K 91/04 57/23
2,498,920 A 2/1950 Holland
2,689,147 A * 9/1954 Smalley ................. A01K 91/04 289/17
2,734,299 A * 2/1956 Masson .................. A01K 91/04 289/17
2,773,713 A * 12/1956 Smalley ................. A01K 91/04 289/17
2,947,558 A * 8/1960 Bethune, Jr. ........... A01K 91/04 289/2
2,987,335 A 6/1961 Tarbox
3,028,185 A 4/1962 Messa
D211,685 S * 7/1968 Hill et al. ....................... 289/17
3,700,272 A * 10/1972 Bauer .................... A01K 91/04 289/17
3,787,081 A * 1/1974 Macy ................... A01K 91/047 289/17

(Continued)

FOREIGN PATENT DOCUMENTS

AU 2013101052 A4 * 9/2013
CN 117509298 A * 2/2024 ............ B65H 54/10

OTHER PUBLICATIONS

Translation CN 117509298.*

*Primary Examiner* — Shaun R Hurley

(57) ABSTRACT

A knot-tying device where lines are mounted in parallel across a longitudinally rotating assembly. Posts set in the assembly cause the lines to wrap around each other when the assembly is rotated. Within the rotating assembly there is there is a vertical spindle capable of independent rotation. Affixed to the vertical spindle and protruding between the lines is a plane object that, when the vertical spindle is rotated, facilitates completion of the knot by expanding the space between the lines for the insertion of the tag ends of the lines. The geometric shape of the plane object is such that rotation of the spindle to successive 90° and 180° positions will reverse the relative orientation of the lines, permitting the user to more easily form a blood knot even when the tag ends of the lines are inserted from the same side of the device.

16 Claims, 14 Drawing Sheets

(56) References Cited

U.S. PATENT DOCUMENTS

| | | | | | |
|---|---|---|---|---|---|
| 3,877,737 | A * | 4/1975 | Chappell | A01K 91/04 | 289/17 |
| 4,400,025 | A * | 8/1983 | Dennison | A01K 91/047 | 289/17 |
| 4,573,719 | A * | 3/1986 | Aldridge | A01K 91/04 | 289/17 |
| 4,871,200 | A * | 10/1989 | Ryder | A01K 91/04 | 289/17 |
| 5,240,295 | A | 8/1993 | Spencer | | |
| 5,494,081 | A * | 2/1996 | Wiedel | B21F 15/04 | 140/93.6 |
| 5,690,369 | A * | 11/1997 | Steck, III | B65H 69/04 | 289/17 |
| 7,419,195 | B1 * | 9/2008 | Jochum | A01K 91/04 | 289/17 |
| 7,494,162 | B1 * | 2/2009 | Howell | A01K 91/047 | 289/17 |
| 9,260,271 | B1 * | 2/2016 | Bowman, Jr. | B65H 69/043 | |
| 9,332,745 | B2 * | 5/2016 | Mashhour | B65H 69/04 | |
| 9,474,259 | B2 | 10/2016 | Banda | | |
| 11,737,441 | B1 | 8/2023 | Reynolds | | |
| 2007/0182157 | A1 * | 8/2007 | Carrier | A01K 91/04 | 289/17 |
| 2009/0302606 | A1 | 12/2009 | Chermanski | | |
| 2012/0055578 | A1 * | 3/2012 | Kodi | B21F 7/00 | 140/149 |
| 2015/0264908 | A1 * | 9/2015 | Banda | A01K 91/04 | 289/1.5 |

* cited by examiner

KNOT-TYING DEVICE

CROSS-REFERENCE TO RELATED APPLICATIONS

This application claims priority to U.S. Provisional Patent Application No. 63/600,799 filed on Nov. 20, 2023, which is incorporated by reference herein.

PRIOR ART

U.S. Patents

U.S. Pat. No. 2,469,037 A, granted to James W Harvey, 3 May 1949
U.S. Pat. No. 2,498,920 A, granted to George H. Holland, 28 Feb. 1950
U.S. Pat. No. 2,773,713 A, granted to Francis A. Smalley, 11 Dec. 1956
U.S. Pat. No. 2,947,558A, granted to George R. Bethune, 2 Aug. 1960
U.S. Pat. No. 2,987,335, granted to John P. Tarbox, 6 Jun. 1961
U.S. Pat. No. 3,028,185A, granted to Daniele Messa, 3 Apr. 1962
U.S. Pat. No. 3,700,272A, granted to George W. Bauer, 24 Oct. 1972
U.S. Pat. No. 3,787,081A, granted to Carl L. Macy, 22 Jan. 1974
U.S. Pat. No. 3,877,737 A, granted to Glenn D Chappell, 15 Apr. 1975
U.S. Pat. No. 4,400,025, granted to R. R. Dennison, 23 Aug. 1983
U.S. Pat. No. 5,240,295A, granted to Donald R. Spencer, 31 Aug. 1993
U.S. Pat. No. 5,690,369A, granted to William F. Steck, III, 25 Nov. 1997
U.S. Patent No. US20090302606, granted to David Chermanski, 10 Dec. 2009
U.S. Patent No. US20150264908A1, granted to Emilio A. Banda, 24 Sep. 2015
U.S. Pat. No. 9,474,259B2, granted to Emilio A. Banda, 25 Oct. 2016
U.S. Pat. No. 11,737,441, granted to James J. Reynolds, 29 Aug. 2023

Foreign Patent Documents

[U.K.] Pat. Appl. No. GB2236648A, filed by William A. Hepworth, 13 Oct. 1989

Non-Patent Citations

"Cottarelli Blood Knot Tool," https://www.1000flies.com/Knot-tool-BLOOD-KNOT-TOOL-cottarelli and https://www.youtube.com/watch?v=XSuSYb3wRE8, accessed Nov. 6, 2024
Koehler Industries, "Tru-Blood Knot Tyer Demonstration," https://www.youtube.com/watch?v=-Yoa3m_oZ88, accessed Nov. 13, 2024
"How to tie the J Knot on The Knothead tool," https://www.youtube.com/watch?v=nMMeXJ7PRCM, accessed Nov. 12, 2024

Other Resources

"Blood Knot Animation|How To Tie Blood Knot," https://www.youtube.com/watch?v=hxPUZTSqe7o, accessed Nov. 17, 2024

"Basic Clinch Knot|Easy To Tie Animation," https://www.youtube.com/watch?v=k7sW50YQDOg, accessed Nov. 17, 2024.
"Trilene Knot," https://www.animatedknots.com/trilene-knot, accessed Nov. 17, 2024.

BACKGROUND OF THE INVENTION

The invention is a device and a system for forming knots in one or more lines. Knots are generally made by twisting a line around itself at least one time and then inserting one end of the line through the loop that is made where the line has been twisted. Often, such twistings of the line over itself are referred to as "wraps." The end of the line inserted through the loop is usually known as the line's "tag end" or "working end" and is the endpoint of the segment of that line is known as the "working part." The remainder of the line customarily is referred to as the "standing part."

When two lines of similar diameter are secured to each other, the resulting knot is known as a "bend." In some cases, bend knots are formed by wrapping the two lines around each other and inserting the tag ends of both lines through the wraps. A well-known example of a bend of this construction is the knot commonly known as the "blood knot," which anglers use to add additional monofilament to the end of their fishing lines. This application will use the blood knot as an exemplar in its description of bend knots, although the invention is capable of tying other bends as well.

A blood knot is difficult to tie because it demands exceptional dexterity. Formation of the knot requires a person to hold both ends of each of the two lines apart while simultaneously wrapping the lines around one another several times. In so doing, the person tying the knot also must maintain a sufficient gap between the wrapped lines to pass the lines' tag ends through that gap. In the case of the blood knot, this difficulty is compounded by the fact that the tag ends must pass through the gap in opposite directions. This can be frustrating to anglers who attempt to form the blood knot with monofilament lines of very small diameter, often in challenging conditions. The purpose of the invention is to use mechanical means to facilitate the tying of the blood knot and other bends. The invention simplifies the process of forming the blood knot in several ways. It secures the ends of the two lines throughout the knot-tying operation, mechanizes the process of wrapping the two lines around one another, facilitates the step of introducing the tag ends through the gap between the two lines, and secures the tag ends during the final steps of knot formation. In addition, the invention simplifies the task of passing of the lines through the gap in opposite directions.

Another embodiment of the invention is to facilitate the process of tying "loop knots," that is, knots made from a single line to form a loop. Loop knots are commonly used in many applications, one of the better-known ones being tying a fishhook to a fishing line. The general terminology of loop knots the same as that described above for bends, with the addition that the object of a loop knot is technically known as the "anchor point." Loop knots ordinarily are formed by passing a single line through or around the anchor point, forming wraps in that line, and then passing the tag end of the line through the gap between the wraps and the anchor point. In this embodiment, the invention secures both the tag end and the standing part of the line, mechanizes the process of forming wraps in that line, and facilitates the step of introducing the tag end of the loop through the gap between the wraps and the anchor point.

SUMMARY OF THE INVENTION

In its first embodiment, the invention consists of a frame with means for holding two lines in parallel and immobilizing both ends of both lines. Two hubs rotate longitudinally within that frame, connected by an off-center rotor shaft that can be likened to a crankshaft. Slits inscribed through the faces of the frame ends and apertures cut through the hubs permit the lines to pass from the exterior to the interior of the device. The off-center rotor shaft, also referred to herein as the "eccentric portion" of the shaft relative to the axis of rotation of the rotor hubs, is offset from the axis of rotation of the rotor hubs such that rotation of the rotor hubs causes the rotor shaft to revolve, or "orbit," about the axis of rotation of the rotor hubs.

Two posts are set perpendicularly at either end of the rotor shaft, both posts being on the plane defined by the rotor shaft's longitudinal axis and the rotor hubs' axis of rotation. Each of the posts is of sufficient length to protrude through the lines and, because of their placement, will pass between the two lines. Mounted on the rotor shaft between the two posts is a spindle generally coplanar with the posts and capable of turning freely. Affixed to the spindle is vertical fin-like member (the "spinner") of similar length as the posts. This spinner is of a specific geometry. It is designed the spread the two lines significantly apart as it rotates in either direction, greatly expanding the gap between the lines and facilitating the user's insertion of the tag ends through that gap. The geometry of the spinner also is designed to reverse the relative vertical positions of the lines depending upon whether it is in the 90° position of the 180° position. This has the benefit of causing the tag ends of the two line to enter the gap from opposite directions even when those tag ends are inserted from the same side of the device. In its default position, the spinner is parallel to the rotor shaft's longitudinal axis and the lines. The spinner referred to herein, which by its disclosed function of spreading and repositioning the two lines as it rotates is also referred to herein as a "separating element," has a specific geometry that provides cam surfaces or camming geometry. Upon rotation of the spindle about the spindle's longitudinal axis, the cam surfaces of the separating element engage the two lines and urge them apart to separate the two lines. When the spinner is in its default position, the cam surfaces of the separating element are not engaging the two lines, and the two lines are held under tension by the line anchors in their parallel arrangement across the frame, at the spacing imposed by that parallel arrangement. As the spindle is rotated from the default position, the cam surfaces of the separating element engage the two lines and displace the two lines in opposite directions away from the spindle to a spacing greater than the spacing of the two lines when the cam surfaces are not engaging the two lines, thereby producing and maintaining a single continuous gap between the two lines over the continuous angular range of rotation of the spindle while the cam surfaces are engaged against the two lines.

Rotating the hubs causes the lines to twist across each other in the space between side of the device and the posts, creating wraps on each end of the device. Because the posts and the spinner are all mounted upon the rotor shaft and do not rotate with respect to each other, no wraps are created in the space between the posts.

Completion of the knot requires the tag ends of the lines to be inserted through the gap between the lines in the space between the posts. This is a narrow space because of the small diameter of the wrapping posts. As mentioned above, the rotation of the spinner greatly expands the gap to facilitate insertion of the tag ends and also simplifies the need to insert the tag ends through opposite sides of the wraps.

Once inserted through the gaps between the lines, the tag ends are immobilized in a fixture mounted upon the frame. The user removes the standing parts of the two lines from the frame and pulls them in opposite directions, completing formation of the knot before trimming away the tag ends.

The second embodiment of the invention is a variant of the first embodiment. In the second embodiment, there are no wrapping posts and the formation of the wraps occurs between the frame ends and the spinner. After the wraps are formed, the spinner is rotated in the manner described above to facilitate insertion of the tag ends.

The third embodiment of the invention also is a variant of the first embodiment. In the third embodiment there is no spinner, and formation of the wraps occurs, as in the first embodiment, between the frame ends and the wrapping posts. This leaves a narrow opening between the lines in the interval between wrapping posts into which the tag ends are inserted.

The fourth embodiment of the invention facilitates the tying of "loop knots." This embodiment consists of a frame with means on one end for immobilizing the tag end and the standing part of a single line and a fixture upon the opposite end of the rotor shaft for holding the anchor point. After immobilizing the standing part of the line in the frame end, the user draws the tag end through or around the anchor point and then returns the tag end to, and immobilizes the tag end in, the frame end. The "anchor point" referred to herein, which is also the "object of the loop knot" referred to above, means any external object, such as a hook, ring, eyelet, or similar feature, to which a line is to be secured by means of the knot.

As in the first embodiment, two hubs rotate longitudinally within the frame. Also as in the first embodiment, there is a vertical spinner affixed to a rotatable spindle mounted perpendicularly upon the rotor shaft, which is of a length sufficient to protrude between the working part and the standing part of the line. The vertical spinner is of a different geometry than that of the first and second embodiments because there is no need in forming a loop knot to reverse the relative positions of the two lines. However, because there may be a benefit to some users to further separate the lines vertically as well as horizontally, the vertical spinner in the example given in the drawing [FIG. 2, 152] is in the shape of a parallelogram so that, when rotated, it will push one line up and the other down.

Rotating the hubs causes the working part and the standing part of the line to twist around the spinner, creating a wrap between the spinner and the frame end and leaving a gap between the spinner and the anchor point. Completion of many loop knots requires the tag end of the loop to be inserted into this gap. When the spinner is rotated, it expands the gap, facilitating insertion of the tag ends.

After the tag end has been inserted, the lines are removed from the frame and tightened to complete the knot.

There is a wide variety of loop knots. In the basic clinch knot and the trilene knot, for example, the tag end is inserted into the anchor point before being inserted through the gap between the spinner, while in the improved clinch knot, the tag end is inserted through the loop it made when it was first inserted through the gap. The fourth embodiment of the device is capable to facilitating the formation of these variations of the loop knot and others.

BRIEF DESCRIPTION OF DRAWINGS

For a more complete understanding of the present disclosure and its advantages, reference is now made to the following description, taken in conjunction with the accompanying drawings. It is emphasized that, according to common practice, the various features of the drawings is not necessarily to-scale.

DETAILED DESCRIPTION OF THE INVENTION

Figure 1:
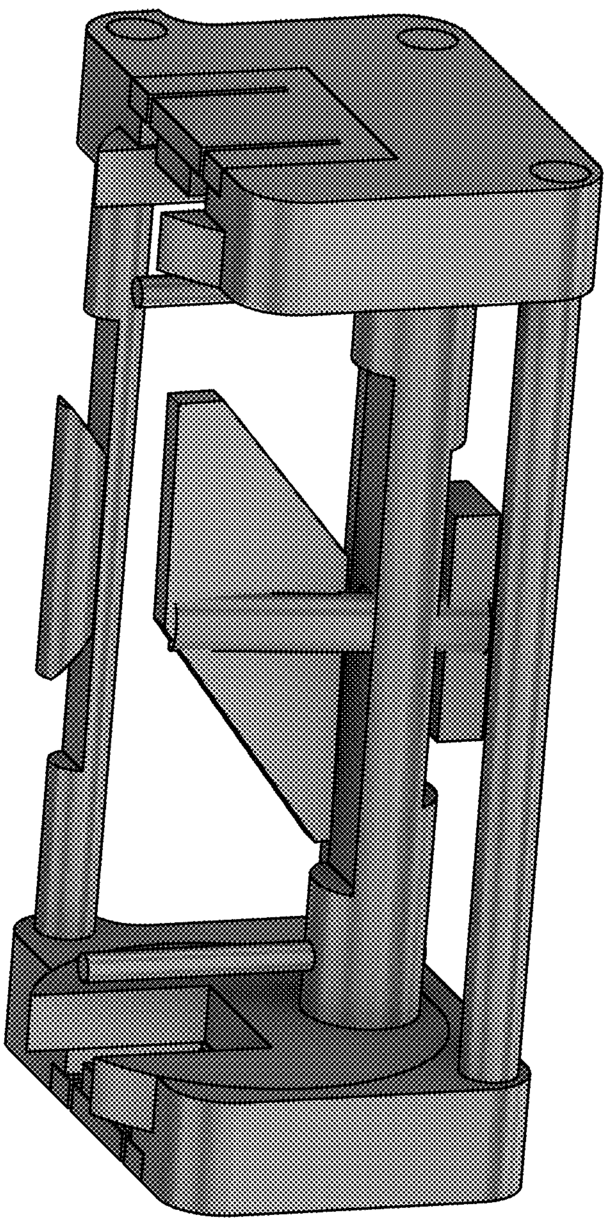
FIG. 1 is an isometric view of the first embodiment of the invention.
Figure 2:
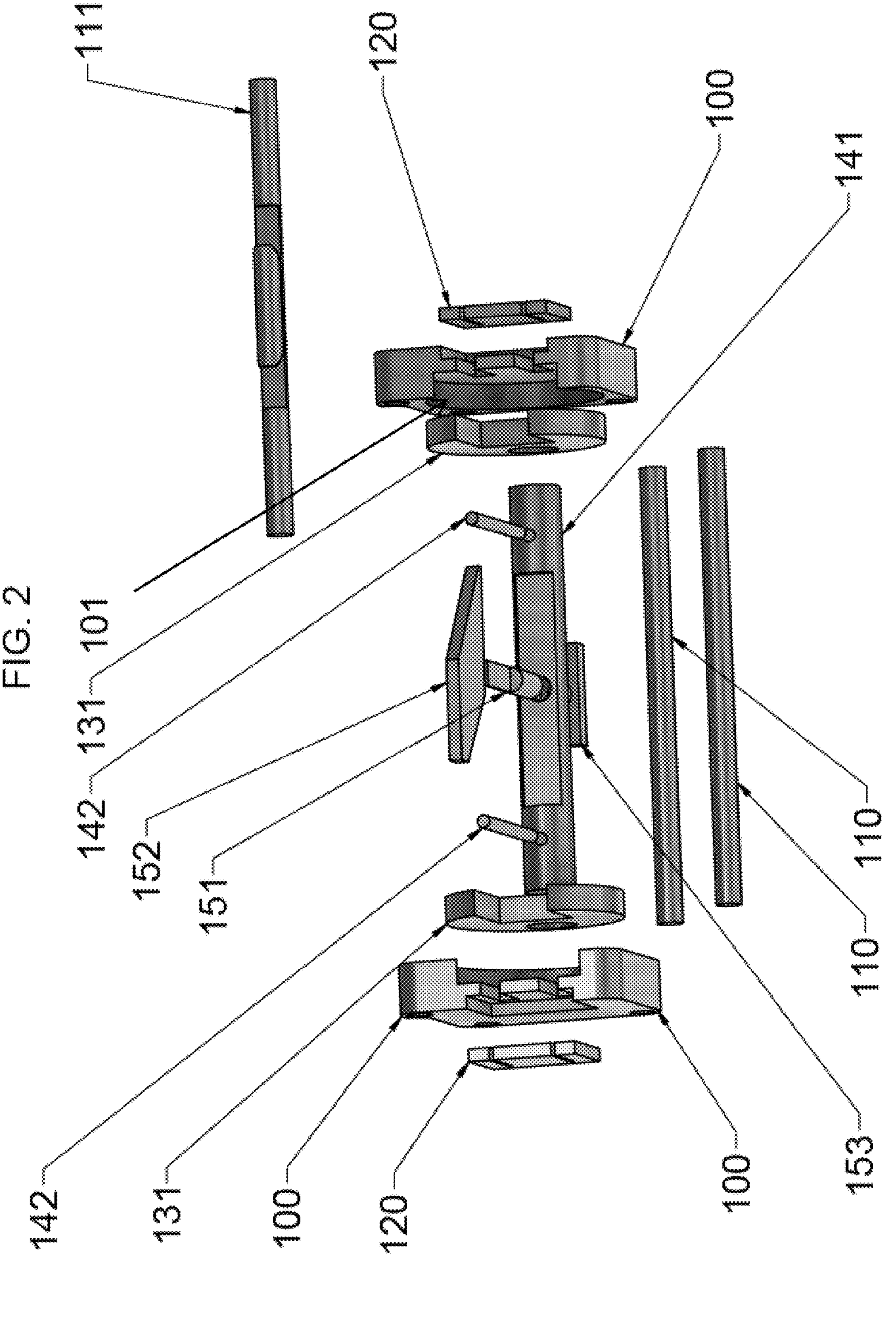
FIG. 2 is an exploded assembly view of the first embodiment of the invention.
Figure 3:
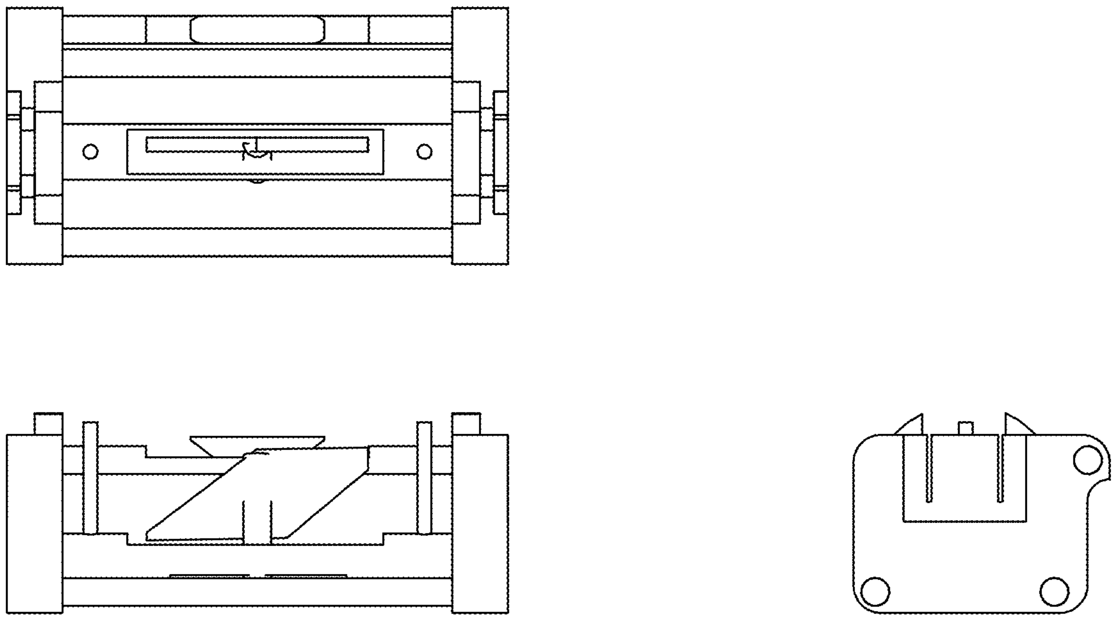
FIG. 3 is an orthographic view of the first embodiment of the invention.
Figure 3A:
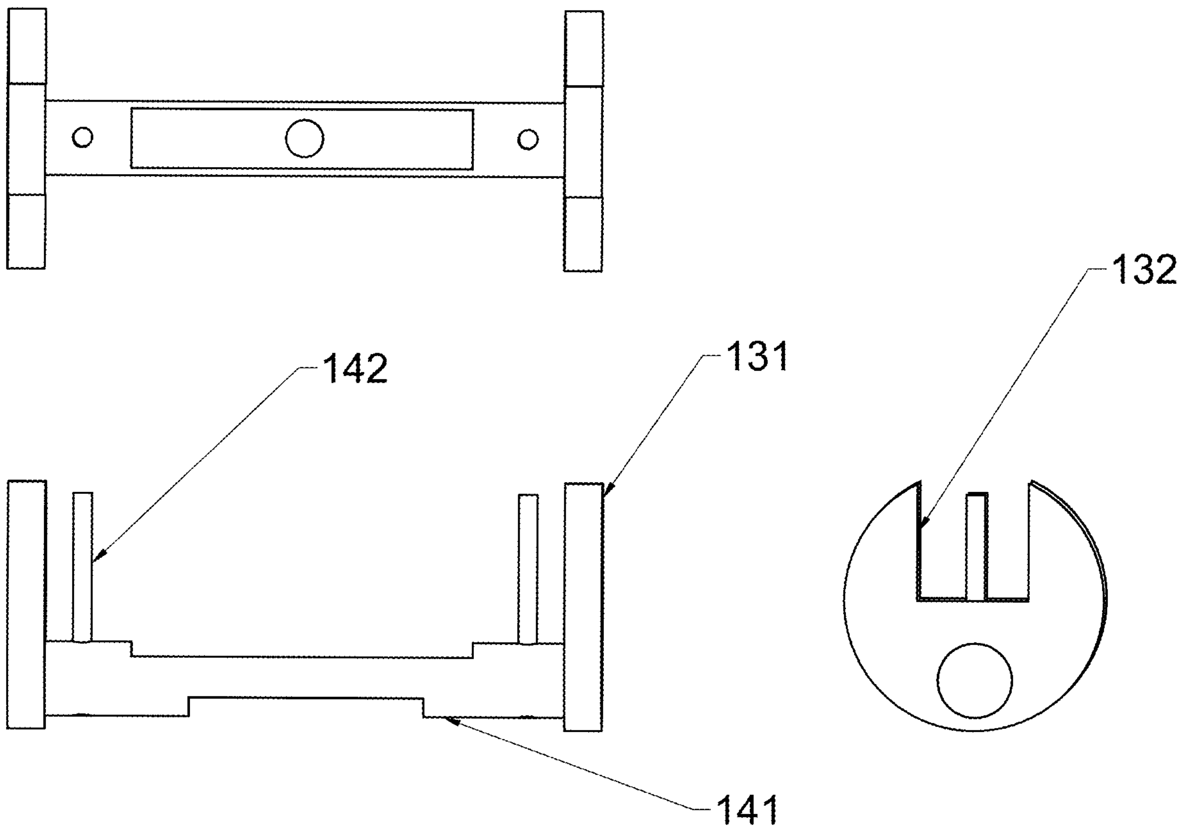
FIG. 3A is an orthographic view of the rotor assembly and wrapping posts in first embodiment of the invention.
Figure 3B:
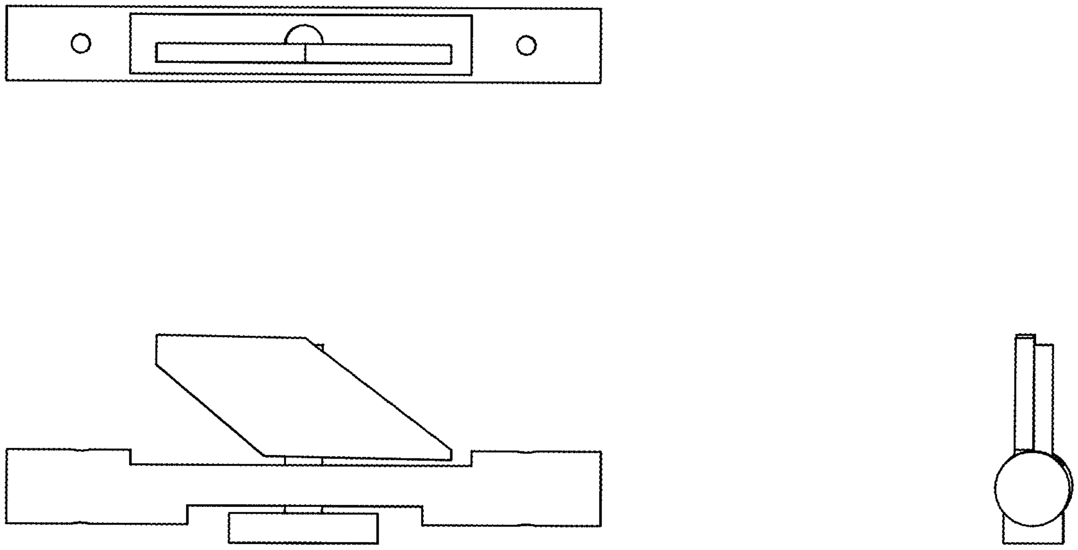
FIG. 3B is an orthographic view of the spinner assembly, mounted upon the rotor shaft, in first embodiment of the invention.

In all four embodiments, the invention consists of three assemblies.

The frame assembly comprises the two frame ends [100] and the frame supports [110] connecting them. The frame ends can be made from plastic, metal or other rigid material and must be of sufficient depth to hold the line anchors [120] and the recesses for the rotor hubs [130] without those elements intersecting. The frame ends are positioned parallel to one another at opposite ends of the device and are connected by the frame supports. A cylindrical recess [101] is cut perpendicularly into the interior face of each frame end, the depth and diameter of the recess matching the thickness and diameter of the rotor hubs. The centroid of each such cylindrical recess is vertically offset from the center of the frame end such that the top of the rotor hub will protrude above the top edge of the frame end sufficiently to allow the rotor hub to be manipulated by hand. The centroids of the said cylindrical recesses are aligned in a manner that the line between them is orthogonal to the faces of the recesses.

Attached to the frame supports are one or more cleats [111] that are used to immobilize the tag ends of the lines during the knot-tying process.

Set upon or within the outside of each frame end and centered in the frame end's upper half is a line anchor [120] made from a flexible membrane that runs from the midpoint of the frame end to the top of the frame end. Two parallel vertical slits are cut perpendicularly and completely through the face of each line anchor such that a line can pass through each one, each slit beginning at the top of the line anchor and being of a length sufficient to reach or nearly reach an imaginary line perpendicular to said vertical slits running through the centroid of the recess for the rotor hubs. The said vertical slits should be sufficiently narrow that the friction between a line and the said flexible membrane will be sufficient to immobilize the line. The said vertical slits are arranged on either side of an imaginary parallel midline that extends vertically from the centroid of the aforesaid cylindrical recess, such vertical slits being spaced no closer to one another than the horizontal width of the spinner and wrapping posts.

There are parallel slots cut completely through the frame end somewhat wider than and no shorter than the aforesaid parallel vertical slits in the line anchors. The said parallel slots should align exactly with the parallel vertical slits in the line anchors such that a line passing through the line anchor also will pass unimpeded through the slot in the frame end.

In the first, second and third embodiments of the invention, the rotor assembly comprises two identical discoid rotor hubs [131] capable of being mounted within the recesses of the frame ends in a manner that permits each to rotate freely and a rotor shaft [141] fixed orthogonally into the face of each rotor hub that causes the rotor hubs to rotate in unison. Although the axis of rotation of the rotor hubs is the line between the two centroids of the rotor hubs, the rotor shaft is offset from this axis of rotation to avoid fouling the lines as the rotor assembly rotates.

To allow for the passage of the lines through the rotor hubs, there are apertures [132] through the entire thickness of each rotor hub from the edge of the rotor hub to its center, the said apertures being generally rectangular and of dimensions large enough to completely expose the aforesaid slots cut into the frame ends. Each aperture is positioned on the rotor hub such that the said aperture's vertical bisector is the plane extending from the longitudinal axis of the rotor shaft through the centroid of the rotor hubs. The rotor hubs are positioned so that their apertures are aligned with each other.

In the first and third embodiments, but not the second, two wrapping posts [142] are affixed to the rotor shaft. Each wrapping post is mounted perpendicularly to the longitudinal direction of the rotor shaft, is on the plane defined by the rotor shaft's longitudinal axis and the rotor hubs' axis of rotation. Each post is of a length sufficient to protrude between the two lines at all times, but does not reach beyond the edge of the rotor hubs' plane of rotation. In the fourth embodiment, the anchor point fixture [445] is affixed to the rotor shaft more or less in the same location, alignment and orientation as one of the wrapping posts.

The spinner assembly comprises the spindle [151], the spinner [152], and the spindle knob [153]. The spindle is a vertical component that rotates freely in a hole cut through the rotor shaft, the axis of said hole being perpendicular to the longitudinal direction of the rotor shaft and on the plane defined by the rotor shaft's longitudinal axis and the rotor hubs' axis of rotation. In the first and second embodiments, the spindle is placed at or near the midpoint of the rotor shaft. In the fourth embodiment, the spindle is offset towards the end of the rotor shaft opposite to the anchor point fixture.

The spinner is a vertical plane object affixed to the spindle such that it is rotated on the axis of the spindle. The uppermost edge of the spinner is of a length sufficient to protrude between the two lines at all times, but does not reach beyond the edge of the rotor hubs' plane of rotation. The spinner is of a specific geometry with two functions. First, it is broad enough to spread apart the two lines after the wraps have been formed in order to expand the size of the gap between them. The second is to change the relative vertical positions of the two lines. This last feature is accomplished by giving the spinner a generally trapezoidal shape that changes the relative vertical positions of the lines as the spindle is rotated from its default position parallel to the rotor shaft's longitudinal axis to a 90° position and then to a 180° position. Thus, when the spinner is rotated as described, the line that previously was pushed down by the spinner now will be pushed up by the spinner and the line that previously was pushed up by the spinner now will be pushed down. This assures that the tag ends will enter the gap between the two sets of wraps in opposite directions even when the tag ends are introduced from the same side of the device.

The spindle knob is affixed to the bottom of the spindle to hold the spindle in place.

Operation of the Invention

First Embodiment

Figure 4:
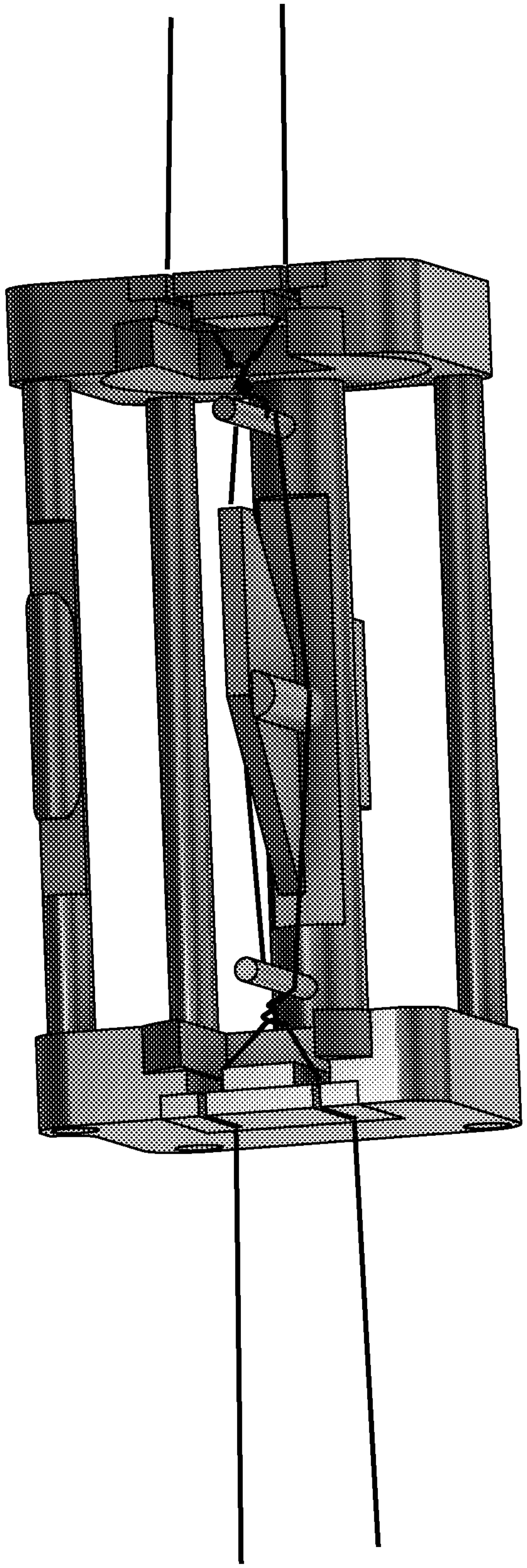
FIG. 4 is an isometric view of the first embodiment of the invention showing the arrangement of the lines during the invention's operation when the spinner is in the default, or 0°, position.
Figure 4A:
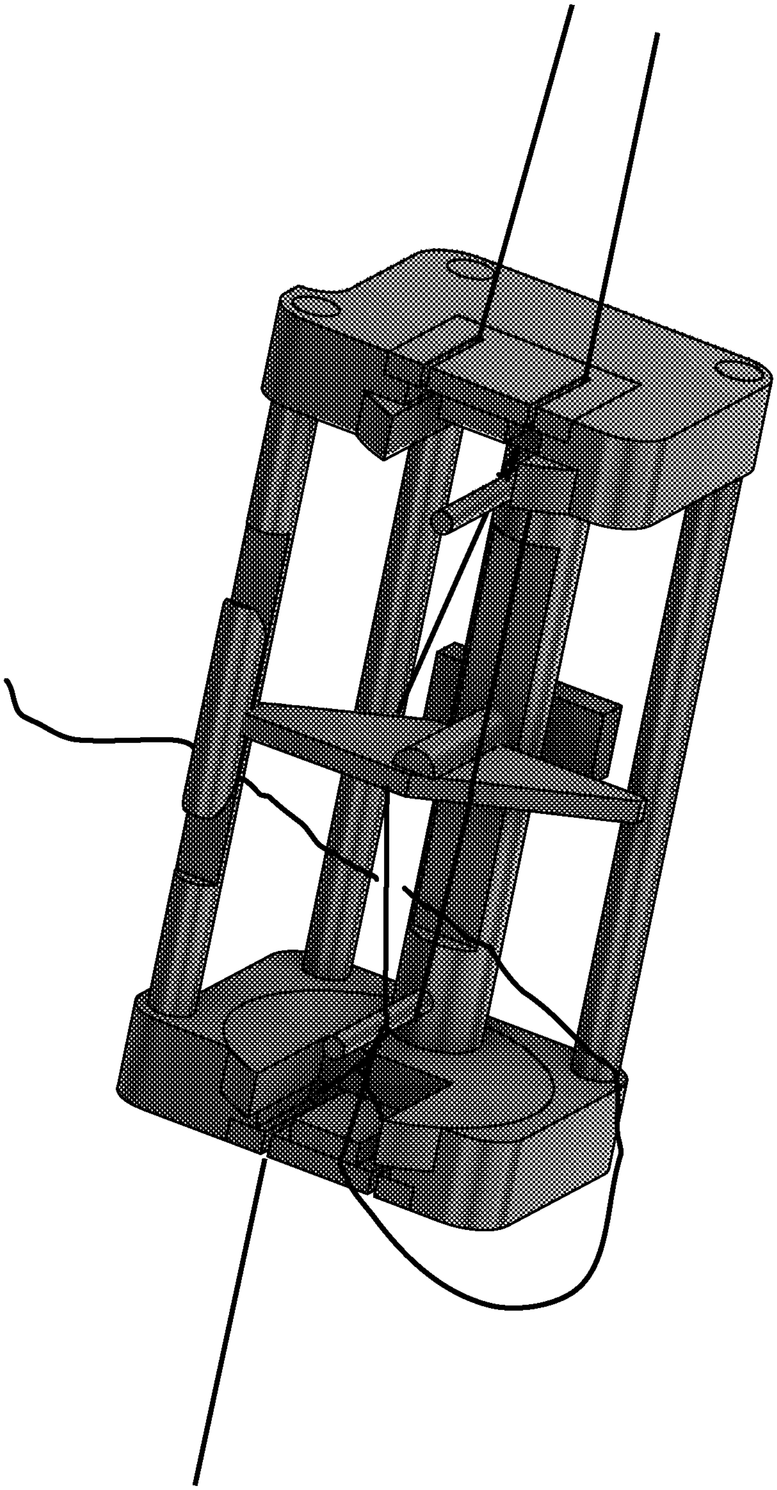
FIG. 4A is an isometric view of the first embodiment of the invention showing the arrangement of the lines during the invention's operation when the spinner is in the 90° position.
Figure 4B:
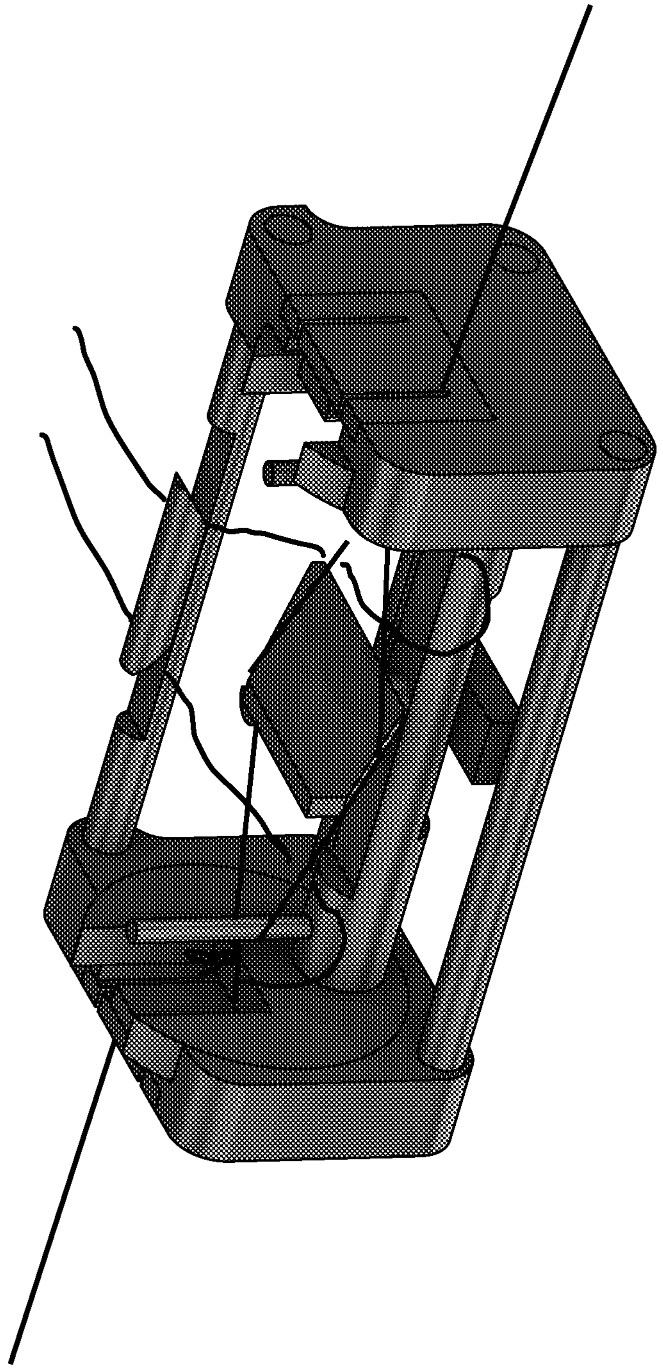
FIG. 4B is an isometric view of the first embodiment of the invention showing the arrangement of the lines during the invention's operation when the spinner is in the 180° position.

The invention's default position [FIG. 4] is where the spinner is parallel to the rotor shaft and the apertures in the rotor hubs are in a vertical position, aligned with the slots in the frame ends.

Step 1. The first step is to mount two lines in parallel longitudinally across the frame of the device by placing each line across the opposing slits of the two line anchors. The lines should be placed at the base of the slits so that they will be near the center of rotation of the rotor hubs and arranged so that the lines are on the opposite sides of the two wrapping posts and the spinner.

For ease of operation, the tag ends of the two lines should be placed at opposite ends of the frame so that, for example, the tag end of one line will be placed on the left front slit of the line anchor and the tag end of the other on the right back slit of the other line anchor.

Step 2. The user turns the rotor hubs several times, which causes the lines to form wraps in the space between the line anchors and wrapping posts.

Step 3. The user rotates the spinner 90° from its default position, which has the effect of creating a pair of accessible triangular openings between the lines in the spaces between the wrapping posts and the spinner. The user then removes one of the tag ends from its slit in the line anchor, inserts the tag end through the nearest triangular opening, and then secures the tag end to a cleat.

If the user wishes to form the knot known as the half-blood knot, they can introduce the remaining tag end through the other triangular opening without changing the position of the spinner.

Step 4. To form the blood knot, the user rotates the spinner another 180°, which has the effect of creating another pair of accessible triangular openings between the lines in the spaces between the wrapping posts the spinner and also reversing the relative positions of the lines. The user removes the remaining tag end from its line anchor, inserts that tag end through the nearest triangular opening, and secures the tag end to a cleat.

Step 5. The user returns the spinner to its default position. The user removes the said standing parts from the anchors and pulls them in opposite direction, forming the blood knot.

Step 6. The tag ends are removed from the cleat and trimmed away.

Second Embodiment

Figure 5:
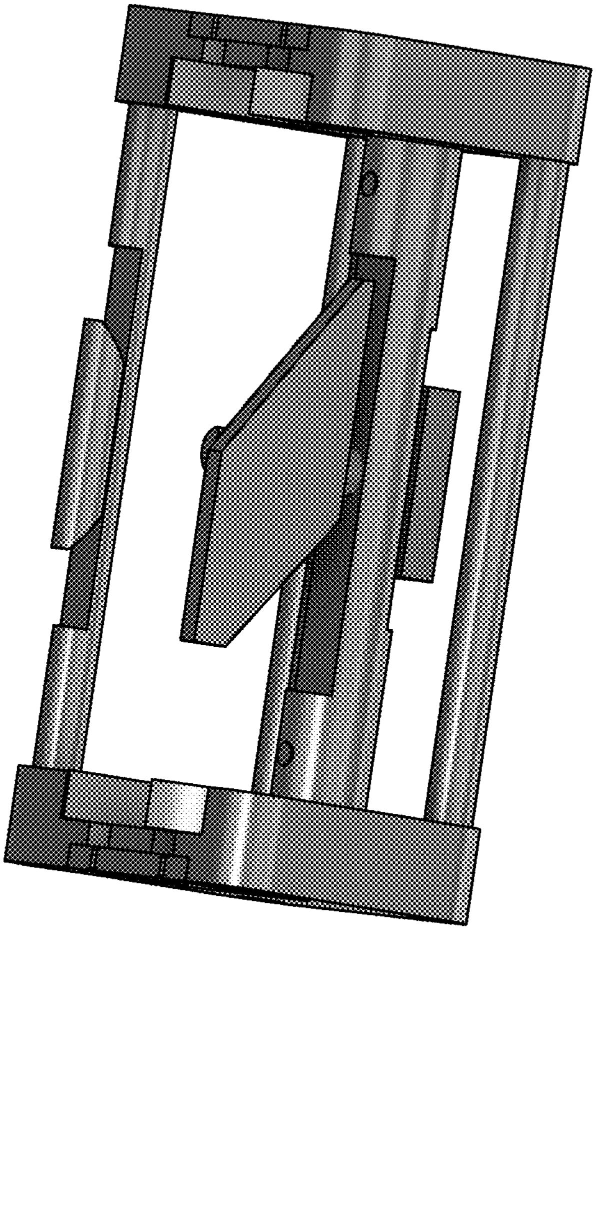
FIG. 5 is an isometric view of the second embodiment of the invention.

The second embodiment of the invention [FIG. 5] is identical with the first embodiment, except that there are no wrapping posts in the device.

As in the first embodiment, the invention's default position is where the spinner is parallel to the rotor shaft and the apertures in the rotor hubs are in a vertical position, aligned with the slots in the frame ends.

Step 1. The first step is to mount two lines in parallel across the frame of the device by placing each line in the opposing slits of the two line anchors. The lines should be placed at the base of the slits so that they will be near the center of rotation of the rotor hubs and arranged so that the lines are on the opposite sides of the spinner.

Step 2. The user turns the rotor hubs several times, which causes the spinner to forms wraps in the lines in the space between the spinner and the line anchors.

Step 3. The user rotates the spinner 90° from its default position, which has the effect of creating a pair of accessible triangular openings between the lines on either side of the spinner. The user then removes one of the tag ends from the slit in the line anchor, inserts the tag end through the nearest triangular opening, and then secures the tag end to a cleat.

If the user wishes to form the knot known as the half-blood knot, they can introduce the remaining tag end through the other triangular opening without changing the position of the spinner.

Step 4. To form the blood knot, the user rotates the spinner another 180°, which has the effect of creating another pair of accessible triangular openings between the lines on either side of the spinner and also reversing the relative positions of the lines. The user removes the remaining tag end from its line anchor, inserts that tag end through the nearest triangular opening, and secures the tag end to a cleat.

Step 5 of the operation of the second embodiment is the same as Step 5 of the first embodiment.

Step 6 of the operation of the second embodiment is the same as Step 6 of the first embodiment.

Third Embodiment

Figure 6:
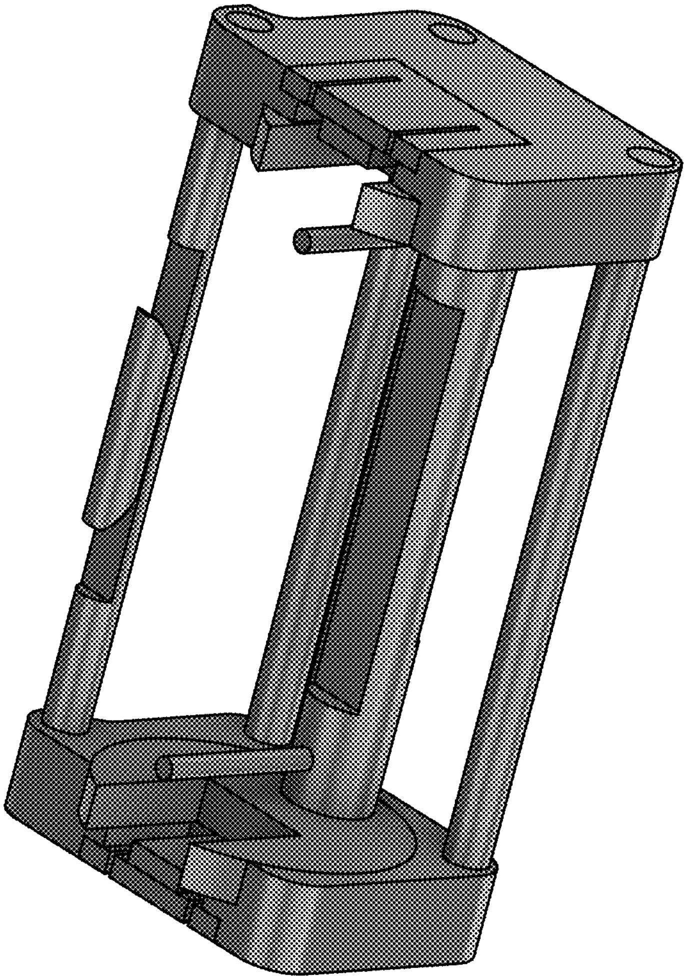
FIG. 6 is an isometric view of the third embodiment of the invention.

The second embodiment of the invention [FIG. 6] is identical with the first embodiment, except for the fact that there is no spinner in the device.

The third embodiment of the device operates in the same manner as the first embodiment, except that the steps of inserting the tag ends of the lines through the lines' standing parts is effectuated by inserting the tag end of each line through the open space between the lines in the space between the two wrapping posts. The tag ends may be inserted in the same direction through the lines or in opposite directions, depending upon which knot the user intends to form. As in the first and second embodiments, the tag ends can be secured in the cleat until the knot-tying operation is completed.

Fourth Embodiment

Figure 7:
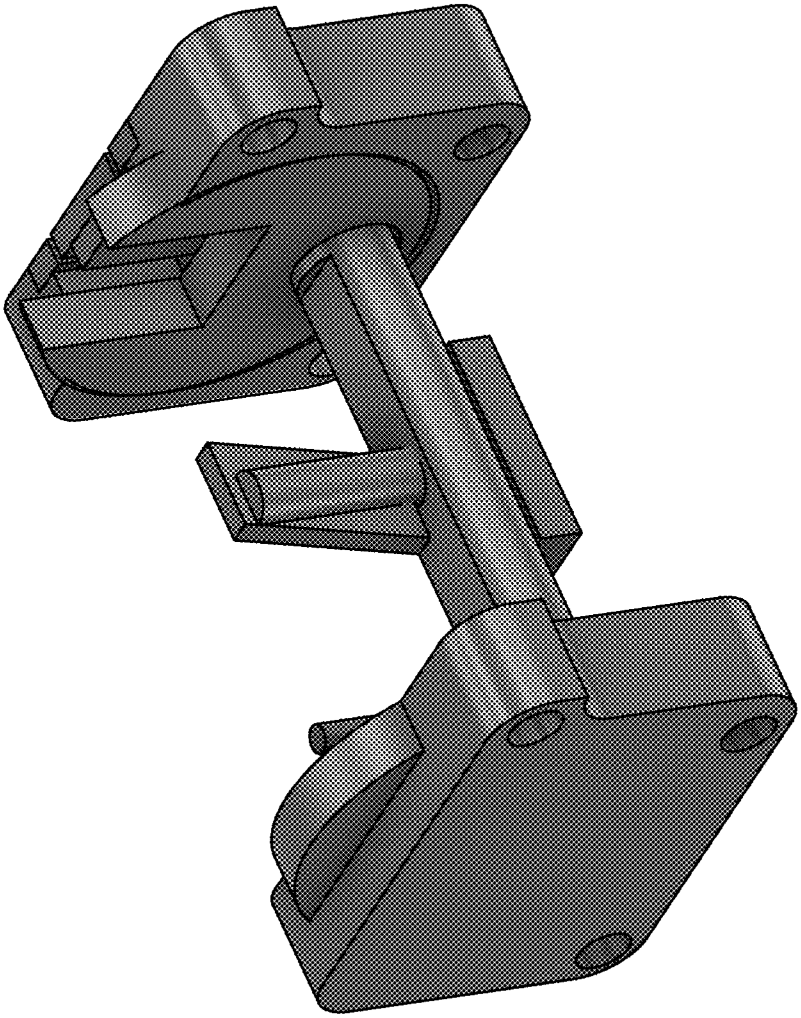
FIG. 7 is an isometric view of the fourth embodiment of the invention.
Figure 8:
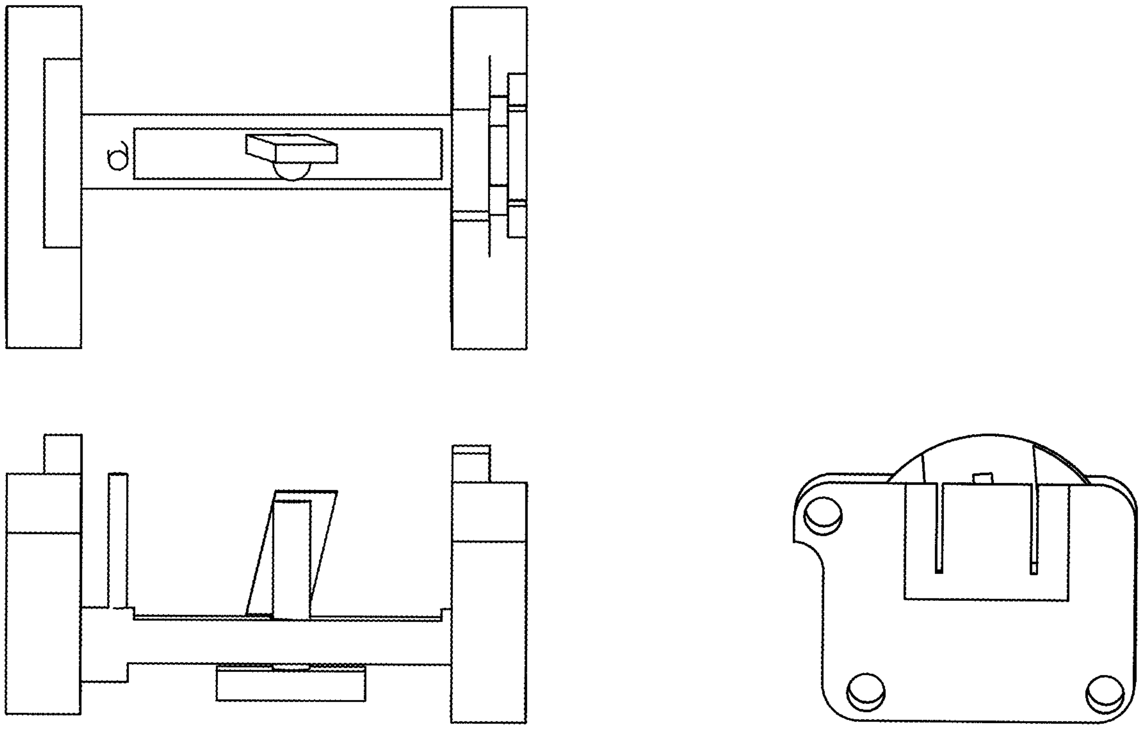
FIG. 8 an orthographic view of the fourth embodiment of the invention.
Figure 9A:
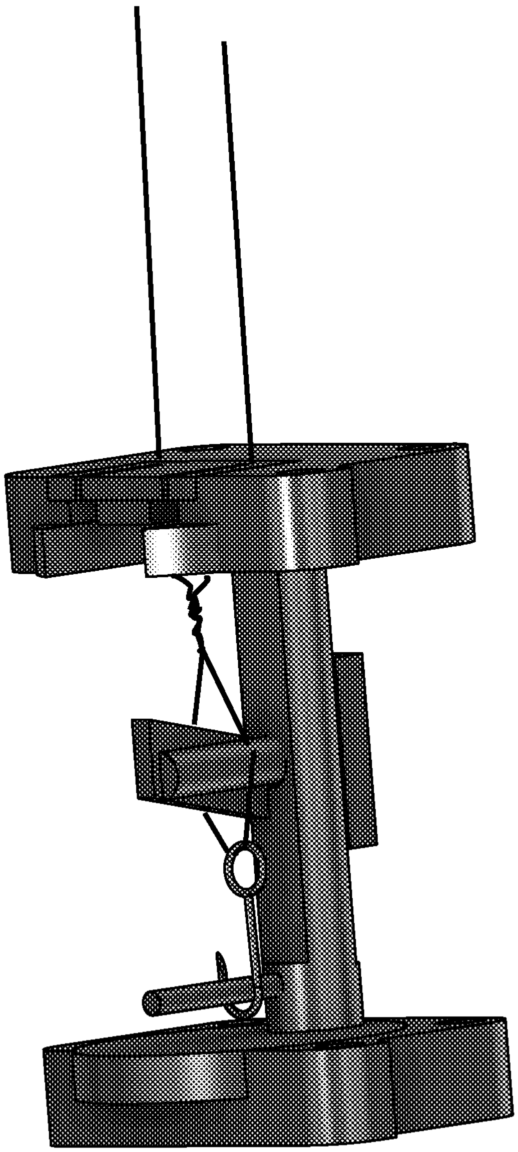
FIG. 9A is an isometric view of the fourth embodiment of the invention showing the arrangement of the lines during the invention's operation when the spinner is in the default, or 0° position.
Figure 9B:
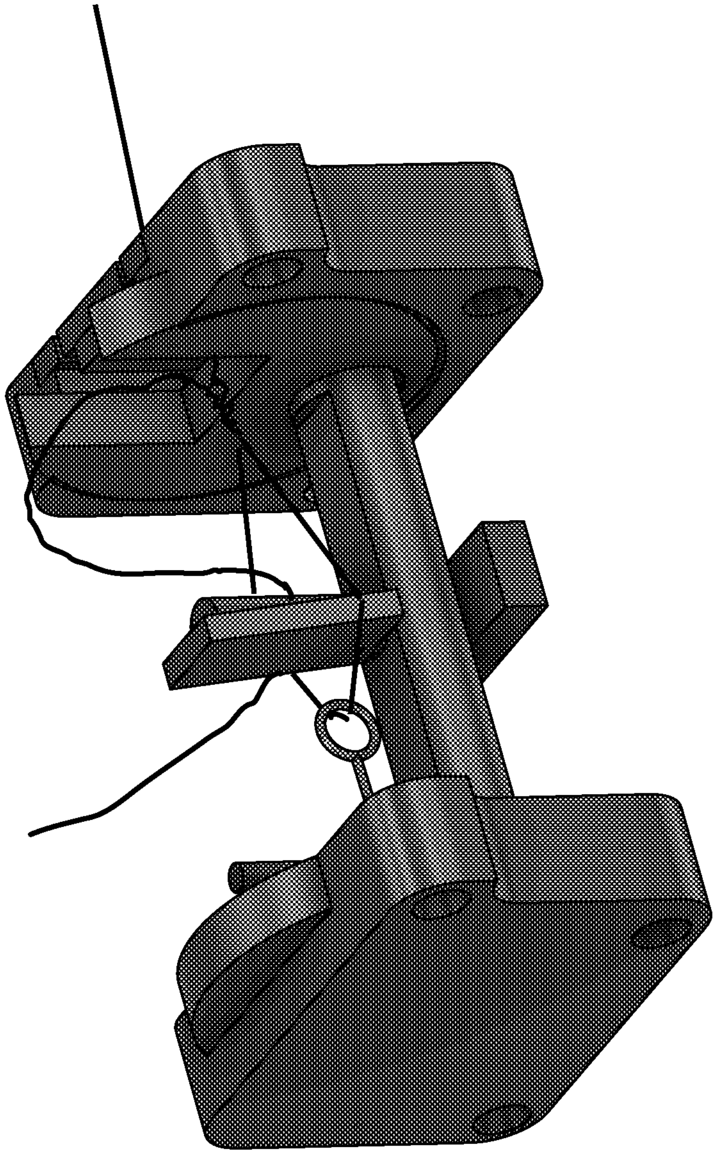
FIG. 9B is an isometric view of the fourth embodiment of the invention showing the arrangement of the lines during the invention's operation when the spinner is in the 90° position.

The invention's fourth embodiment [FIG. 7] is a device that forms a loop knot in a single line. As described in the accompanying drawings, the fourth embodiment is similar to the first embodiment, except that the spinner assembly is offset to one end of the rotor shaft and only the line anchor on that end of the device is necessary for the device's operation. As a result, the design of the fourth embodiment can dispense with certain features on the opposite end of the device, such as the line anchor, frame end slots and rotor hub aperture. In the fourth embodiment, the wrapping post ordinarily located between the spinner and the line-anchor-bearing frame end is retained and functions as the single wrapping post of the device, while the wrapping post otherwise located on the opposite side of the spinner is replaced by an anchor point fixture, as further described above.

As in the other embodiments, the default position of the device in the fourth embodiment is where the spinner is parallel to the rotor shaft and the aperture in the rotor hub is in a vertical position, aligned with the slots in the frame end.

Step 1. The first step is to create a loop in a single line that intersects the anchor point. This is done by placing the standing part of the line in one of the slits in the line anchor, drawing the tag end of the line to the anchor point fixture, looping the tag end through or around the anchor point at least once, drawing the tag end back to its origin, and securing the tag end in the remaining slit in the line anchor. Both standing part and the tag end of the line should be placed at the base of the slits so that they will be near the center of rotation of the rotor hub and arranged so that the said standing part and said working part of the line are on opposite sides of the spinner.

Step 2. The user turns the rotor hub several times, which causes the spinner to wrap the standing part and working part of the line around each other in the space between the line anchor and the spinner.

Step 3. The user rotates the spinner 90° from its default position in either direction, which has the effect of pushing the standing part and working part of the line apart. The geometry of the spinner piece may also be such that the said 90° rotation of the spinner has the effect of also pushing the standing part and working part of the line apart vertically.

Step 4. The user then removes the tag end from the slit in the line anchor, and inserts the tag end through the opening between the standing part and working part of the line in the space between the spinner and the anchor point. Depending upon the specific knot to be formed, the user may also insert the tag end in the anchor point a second time, in the loop the tag end made during its insertion in the said expanded triangular opening, or in other places.

Step 5. The user returns the spinner to its default position and removes the line with or from the anchor point from the device.

Step 6. The user tightens the standing part and tag end of the line as required to form the knot and trims away the remaining part of the tag end.

The invention claimed is:

1. A tool for tying a bend between two lines, comprising:

(a) a frame including opposed frame ends configured to hold the two lines in a parallel arrangement extending across the frame ends, the two lines being held in positions such that a first rotational axis lies in a plane defined by the two lines;

(b) a shaft rotatably mounted between the frame ends about the first rotational axis, the shaft having an eccentric portion offset from the first rotational axis;

(c) a spindle mounted on the eccentric portion such that the spindle's longitudinal axis is positioned to extend between the two lines, the spindle being rotatable about the spindle's longitudinal axis;

(d) a separating element mounted on or integral with the spindle, extending between the two lines, wherein rotation of the shaft causes the separating element to revolve about the first rotational axis while passing between the two lines and thereby twist the two lines together; and (e) the said separating element having cam surfaces that, upon rotation of the spindle about the spindle's longitudinal axis, engage each of the two lines and displace the two lines in opposite directions away from the spindle to a spacing greater than the spacing of the two lines when the cam surfaces are not engaging the two lines, thereby producing and maintaining a single continuous gap between the two lines over a continuous angular range of rotation of the spindle while the cam surfaces are engaged against the two lines.

2. The tool of claim 1, wherein the separating element has a first cam surface and a second cam surface, each inclined at an angle to the spindle's longitudinal axis.

3. The tool of claim 1, wherein the cam surfaces of the separating element are configured such that, upon rotation of the spindle, the cam surfaces displace the two lines in opposite axial directions along the spindle's longitudinal axis simultaneously with displacing the two lines in opposite radial directions away from the spindle.

4. The tool of claim 1, wherein the separating element is configured such that:

(a) in its default position, neither cam surface of the separating element engages either of the two lines;

(b) rotation of the spindle from its default position brings the cam surfaces of the separating element into engagement with the two lines and cams the two lines in opposite directions to create a first gap between the two lines; and (c) further rotation of the spindle through an additional one hundred eighty degrees from the position recited in (b) revolves the spindle through a position in which neither cam surface of the separating element engages either of the two lines, and then brings the cam surfaces of the separating element back into engagement with the two lines and again cams the two lines in opposite directions to create a second gap between the two lines.

5. The tool of claim 4, wherein the cam surfaces of the separating element are configured such that rotation of the spindle to a first angular orientation creates a first gap between the two lines and further rotation of the spindle through one hundred eighty degrees from the first angular orientation to a second angular orientation creates a second gap between the two lines, the first gap and the second gap being so positioned and oriented relative to the two lines that:

(a) the first gap and the second gap are accessible from a same side of the tool; and (b) a first tag end of one of the two lines passed through the first gap from said same side of the tool and a second tag end of the other of the two lines passed through the second gap from said same side of the tool extend across the two lines in opposite directions.

6. A method of tying a bend between two lines using the tool of claim 1, comprising:

(a) positioning the two lines across the frame of the tool on opposite sides of the separating element;

(b) rotating the shaft to cause the separating element to revolve around the first rotational axis while passing between the two lines, thereby twisting the two lines around one another;

(c) rotating the spindle about the spindle's longitudinal axis so that the cam surfaces of the separating element urge the two lines apart to create a gap extending across the separating element; and (d) inserting a tag end of each of the two lines through the gap to complete the bend.

7. A method of tying a bend between two lines using the tool of claim 1, comprising, in the following order:

(a) positioning the two lines across the frame of the tool on opposite sides of the separating element;

(b) rotating the shaft to cause the separating element to revolve around the first rotational axis while passing between the two lines, thereby twisting the two lines around one another;

(c) with the separating element initially in a default position in which the cam surfaces of the separating element do not engage either of the two lines, rotating the spindle about the spindle's longitudinal axis from the said default position so that the cam surfaces of the separating element engage and cam the two lines in opposite directions, thereby creating a first gap extending across the separating element;

(d) inserting a first tag end of one of the two lines through the first gap;

(e) further rotating the spindle through an additional one hundred eighty degrees from the position recited in step (c) so that the spindle revolves through a position in which the cam surfaces do not engage either of the two lines, and thereby bringing the cam surfaces of the separating element back into engagement with the two lines and again camming the two lines in opposite directions to create a second gap extending across the separating element; and (f) inserting a second tag end of the other of the two lines through the second gap from the same side of the tool as the first tag end.

8. A method of tying a bend between two lines using the tool of claim 1, comprising, in the following order:

(a) positioning the two lines across the frame of the tool on opposite sides of the separating element;

(b) rotating the shaft to cause the separating element to revolve around the first rotational axis while passing between the two lines, thereby twisting the two lines around one another;

(c) with the separating element initially in a default position in which the cam surfaces of the separating element do not engage either of the two lines, rotating the spindle about the spindle's longitudinal axis from the said default position so that the cam surfaces of the separating element engage and cam the two lines in opposite directions, thereby creating a first gap extending across the separating element;

(d) inserting a first tag end of one of the two lines through the first gap from a side of the tool;

(e) further rotating the spindle through an additional one hundred eighty degrees from the position recited in step (c) so that the spindle revolves through a position in which the cam surfaces do not engage either of the two lines, and thereby bringing the cam surfaces of the separating element back into engagement with the two lines and again camming the two lines in opposite directions to create a second gap extending across the separating element; and (f) inserting a second tag end of the other of the two lines through the second gap from said side of the tool, such that the first tag end and the second tag end extend across the two lines in opposite directions.

9. A tool for tying a bend between two lines, comprising:

(a) a frame including a pair of opposed frame ends configured to hold the two lines in a parallel arrangement extending across the frame ends, the two lines being held in positions such that a first rotational axis lies in a plane defined by the two lines;

(b) a pair of rotor hubs rotatably mounted within the opposed frame ends and rotatable in unison about the first rotational axis, each rotor hub having an aperture extending from the rotor hub's circumference to the rotor hub's center of rotation, the apertures being configured to permit passage of the two lines therethrough on the first rotational axis;

(c) a shaft extending between the rotor hubs along a longitudinal axis parallel to and laterally offset from the first rotational axis, such that no part of the shaft lies upon the first rotational axis;

(d) a pair of posts mounted on the shaft at locations spaced apart along the shaft longitudinally, each post extending between the two lines; and (e) wherein, when the rotor hubs are rotated, the shaft and the pair of posts revolve around the first rotational axis, the pair of posts being so positioned along the shaft that the longitudinal spacing between the pair of posts maintains the two lines untwisted in a region of the two lines between the pair of posts and permits twisting of the two lines only in regions of the two lines between each post and the adjacent frame end, thereby defining a gap between the two lines in the region between the pair of posts.

10. A tool for tying a bend between two lines, comprising:

(a) a frame including a pair of opposed frame ends configured to hold the two lines in a parallel arrangement extending across the frame ends, the two lines being held in positions such that a first rotational axis lies in a plane defined by the two lines;

(b) a pair of rotor hubs rotatably mounted within the opposed frame ends and rotatable in unison about the first rotational axis;

(c) a shaft fixed between the rotor hubs, the shaft having an eccentric portion offset from the first rotational axis;

(d) a pair of posts mounted on the eccentric portion of the shaft at locations spaced apart along the shaft longitudinally, each post extending between the two lines;

(e) wherein, when the rotor hubs are rotated, the shaft and the pair of posts revolve around the first rotational axis, the pair of posts being so positioned along the shaft that the longitudinal spacing between the pair of posts maintains the two lines untwisted in a region of the two lines between the pair of posts and permits twisting of the two lines only in regions of the two lines between each post and the adjacent frame end, thereby defining a gap between the two lines in the region between the pair of posts;

(f) a spindle mounted on the eccentric portion of the shaft between the pair of posts, the spindle being positioned to extend between the two lines and rotatable about its longitudinal axis;

(g) a separating element mounted on or integral with the spindle, extending between the two lines; and (h) the said separating element having cam surfaces that, upon rotation of the spindle about the spindle's longitudinal axis, engage each of the two lines and displace the two lines in opposite directions away from the spindle to a spacing greater than the spacing of the two lines when the cam surfaces are not engaging the two lines, thereby producing and maintaining a single continuous gap between the two lines in the region between the pair of posts over a continuous angular range of rotation of the spindle while the cam surfaces are engaged against the two lines.

11. The tool of claim 10, wherein the separating element is configured such that:

(a) in its default position, neither cam surface of the separating element engages either of the two lines;

(b) rotation of the spindle from its default position brings the cam surfaces of the separating element into engagement with the two lines and cams the two lines in opposite directions to create a first gap between the two lines; and (c) further rotation of the spindle through an additional one hundred eighty degrees from the position recited in (b) revolves the spindle through a position in which neither cam surface of the separating element engages either of the two lines, and then brings the cam surfaces of the separating element back into engagement with the two lines and again cams the two lines in opposite directions to create a second gap between the two lines.

12. The tool of claim 11, wherein the cam surfaces of the separating element are configured such that rotation of the spindle to a first angular orientation creates a first gap between the two lines and further rotation of the spindle through one hundred eighty degrees from the first angular orientation to a second angular orientation creates a second gap between the two lines, the first gap and the second gap being so positioned and oriented relative to the two lines that:

(a) the first gap and the second gap are accessible from a same side of the tool; and (b) a first tag end of one of the two lines passed through the first gap from said same side of the tool and a second tag end of the other of the two lines passed through the second gap from said same side of the tool extend across the two lines in opposite directions.

13. A tool for forming a knot in a single line around an anchor point, comprising:

(a) a frame configured to receive the line and to hold the line in a loop having a standing portion and a tag portion arranged in a parallel arrangement extending across the frame, the standing portion and the tag portion being held in positions such that a first rotational axis lies in a plane defined by the standing portion and the tag portion;

(b) a shaft rotatably mounted with respect to the frame about the first rotational axis, the shaft having an eccentric portion offset from the first rotational axis;

(c) a spindle mounted on the eccentric portion of the shaft such that the spindle's longitudinal axis is positioned to extend between the standing portion and the tag portion of the line, the spindle being rotatable about the spindle's longitudinal axis;

(d) a separating element mounted on or integral with the spindle, extending between the standing portion and the tag portion of the line such that the standing portion and the tag portion are on opposite sides of the separating element;

(e) wherein rotation of the shaft causes the separating element to revolve around the first rotational axis, thereby twisting the standing portion and the tag portion of the line together; and (f) the said separating element having cam surfaces that, upon rotation of the spindle about the spindle's longitudinal axis, engage each of the standing portion and the tag portion of the line and displace the standing portion and the tag portion in opposite directions away from the spindle to a spacing greater than the spacing of the standing portion and the tag portion when the cam surfaces are not engaging the standing portion and the tag portion, thereby producing and maintaining a single continuous gap between the standing portion and the tag portion over a continuous angular range of rotation of the spindle while the cam surfaces are engaged against the standing portion and the tag portion.

14. A method of forming a knot in a single line around an anchor point using the tool of claim 13, comprising:

(a) passing the line through the frame and around the anchor point so as to define a standing portion and a tag portion of the line;

(b) positioning the line in the tool with the separating element disposed between the standing portion and the tag portion;

(c) rotating the shaft to cause the separating element to revolve around the first rotational axis and pass between the standing portion and the tag portion, thereby twisting the standing portion and the tag portion together;

(d) rotating the spindle about the spindle's longitudinal axis so that the cam surface of the separating element cams against the standing portion and the tag portion of the line to urge the standing portion and the tag portion apart to create a gap extending across the width of the separating element; and (e) inserting the tag end through the gap to complete the knot.

15. A tool for forming a loop knot in a line, comprising:

(a) a frame having a first frame end and a second frame end, the first frame end being configured to hold the line in a loop having a standing portion and a tag portion arranged in a parallel arrangement extending across the first frame end, the standing portion and the tag portion being held in positions such that a first rotational axis lies in a plane defined by the standing portion and the tag portion;

(b) a pair of rotor hubs rotatably mounted within the first frame end and the second frame end and rotatable in unison about the first rotational axis, the rotor hub mounted within the first frame end having an aperture extending from its circumference to its center of rotation to permit passage of the standing portion and the tag portion of the line therethrough;

(c) a shaft fixed between the rotor hubs, the shaft having an eccentric portion offset from the first rotational axis;

(d) a spindle mounted on the eccentric portion of the shaft such that the spindle's longitudinal axis is positioned to extend between the standing portion and the tag portion of the line, the spindle being rotatable about the spindle's longitudinal axis;

(e) a separating element mounted on or integral with the spindle, extending between the standing portion and the tag portion of the line, and having cam surfaces;

(f) a single post mounted on the eccentric portion of the shaft between the first frame end and the spindle, the single post extending between the standing portion and the tag portion of the line;

(g) wherein rotation of the rotor hubs causes the shaft to revolve around the first rotational axis, such that the single post engages the line to twist the line around itself in the region of the line between the single post and the first frame end, while the portion of the line between the single post and the separating element remains untwisted; and (h) rotation of the spindle about the spindle's longitudinal axis causes the cam surfaces of the separating element to engage each of the standing portion and the tag portion of the line and displace the standing portion and the tag portion in opposite directions away from the spindle to a spacing greater than the spacing of the standing portion and the tag portion when the cam surfaces are not engaging the standing portion and the tag portion, thereby producing and maintaining a single continuous gap between the standing portion and the tag portion over a continuous angular range of rotation of the spindle while the cam surfaces are engaged against the standing portion and the tag portion.

16. A method of forming a loop knot using the tool of claim 15, comprising:

(a) passing the line through the aperture of the rotor hub mounted within the first frame end, looping the tag end of the line through or around the anchor point, and drawing the tag end back through the aperture of the rotor hub mounted within the first frame end so as to form a loop in the line having a standing portion and a tag portion, the loop being positioned such that the standing portion and the tag portion are on opposite sides of the separating element and on opposite sides of the single post;

(b) rotating the rotor hubs to cause the shaft, the spindle, the separating element, and the single post to revolve around the first rotational axis, the single post thereby engaging the line to twist the line around itself in the region of the line between the single post and the first frame end, the segment of the line between the single post and the separating element remaining untwisted;

(c) rotating the spindle about the spindle's longitudinal axis so that the cam surfaces of the separating element cam against the standing portion and the tag portion of the line to urge the standing portion and the tag portion apart to create a gap extending across the separating element; and (d) inserting the tag end through the gap to complete the loop knot.

* * * * *